Feb. 6, 1923.  W. S. NICHOLS  1,444,354
PLOW
Filed Feb. 27, 1917
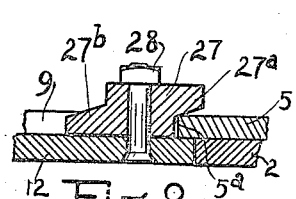
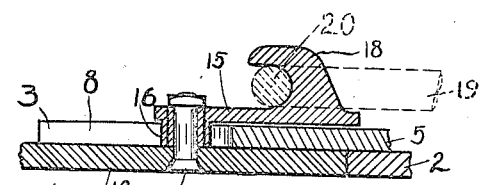
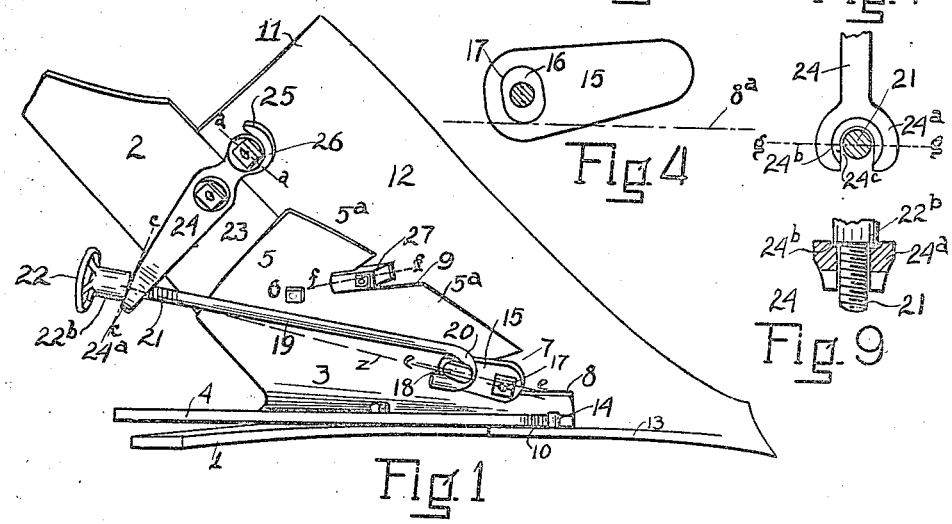
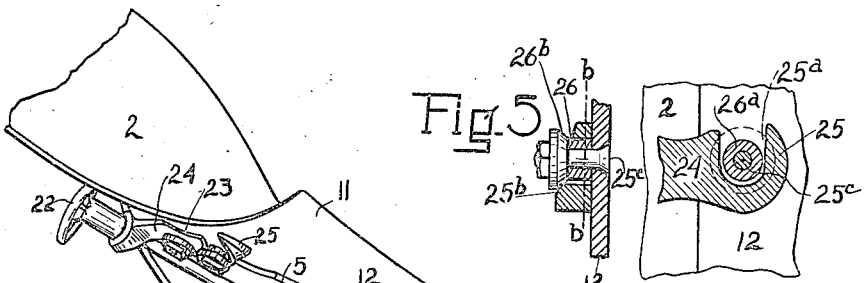
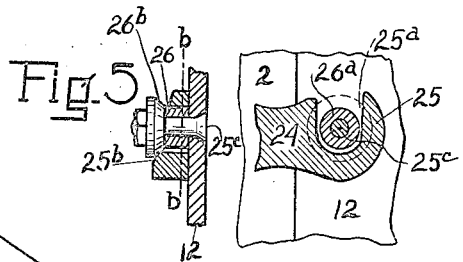
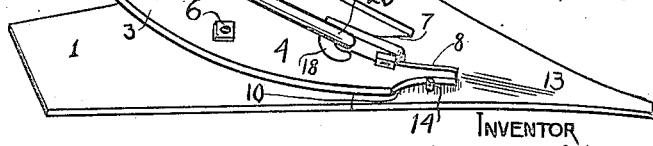
WITNESSES:
George Knick
J. David Dickinson
INVENTOR
WINFIELD S. NICHOLS
by C. W. Dickinson
his Attorney Patented Feb. 6, 1923.

1,444,354

UNITED STATES PATENT OFFICE.

WINFIELD S. NICHOLS, OF LA CROSSE, WISCONSIN.

PLOW.

Application filed February 27, 1917. Serial No. 151,312.

*To all whom it may concern:*

Be it known that I, WINFIELD S. NICHOLS, a resident of the city of La Crosse, county of La Crosse, State of Wisconsin, and of the United States of America, have invented certain new and useful Improvements in Plows, of which the following is a full specification thereof.

The invention relates to plows having detachable shares.

The object of the invention is to provide means for rapidly and detachably securing a share to the plow and securely holding it in position on the plow for plowing work, and for rapidly releasing the share so that it may be quickly and easily removed from the plow with a minimum of effort.

Another object of the invention is to provide mechanism whereby in assembling the parts of the plow in the shops, the parts may be held together easily during the process of manufacture, and the share quickly removed and put in place, and which shall be of comparatively low cost.

In the drawings, Fig. 1 shows a perspective view of a plow embodying my invention, the drawing showing a bottom view looking upward; Fig. 2 is a similar view, but more oblique, and looking at the bottom from a position toward the wing of the plow; Fig. 3 is a detail on the line *e—e* of Fig. 1, and showing the clamping lever for fastening the share to the frame of the plow, the lever being pivoted to the share; Fig. 4 is a detail showing a top view of the same lever, and the contact of the cam thereon against the wall of the frog. Fig. 5 is a detail in cross section of the hook portion of the lever pivoted to the wing of the moldboard for engaging the share towards the outer extremity of its wing, being taken on line *a—a* of Fig. 1; Fig. 6 is a detail of the hook portion of the same lever at the wing of the moldboard being taken on line *b—b* of Fig. 5; Fig. 7 is a detail of the same lever at its opposite end, taken on the line *c—c* of Fig. 1, the connecting rod being shown in cross section, and showing the forks between which the connecting rod passes; Fig. 8 is a detail of the clamping lug fastened centrally of the share and engaging a corner of the wing portion of the frog, taken on the line *f—f* of Fig. 1; Fig. 9 is a detail of the free end of the moldboard lever taken on line *g—g* of Fig. 7.

The frame of the plow comprises the landside 1, the moldboard 2, and the frog 3 having the landside portion 4 and the wing portion 5 at an angle with each other, the mold board being above the frog, and all the parts secured rigidly together as by the bolts 6. The frog extends downwardly and forwardly beyond the lower edge of the moldboard, where it is provided with an opening, unclosed, 7, having a vertical wall 8 that is parallel with the landside portion of the frog and of the share; this opening is placed toward the landside portion of the frog and reaches backwardly, terminating at a point below the lower edge of the moldboard. The wing portion of the frog extends well toward the wing portion of the moldboard so as to afford a suitable support for the moldboard and the share where the latter is seated upon it.

Between the opening 7 and the extremity of the frog outwardly, is another unclosed opening, 9. These openings are made open that the share may slide rearwardly freely upon the upper face of the frog without having to lift the share in so doing. Toward the lower forward end of the landside portion of the frog the latter is cut away to form an open recess 10 in the lower edge thereof.

The share, 11, is adapted to rest upon the upper face of the frog, with the rear edge of its wing portion, 12, in juxtaposition with the lower edge of the moldboard, the inner face of its landside portion, 13, resting against the outer wall of the frog, the rear end of its landside resting firmly against the forward end of the landside 1 of the frame. Projecting inwardly from the share landside is a stud, 14, which is so positioned as to rest beneath and in contact with the lower edge of the cut-away portion 10 of the frog landside, to hold the share firmly against upward thrust.

Pivoted upon the under face of the share toward its rear edge, placed to enter the opening 7 by its cam projection 16, is a lever 15, rotatable about the pivot bolt 17 that loosely secures the lever to the wing portion of the share, as shown in cross section in Fig. 3 in position reversed from that shown in Fig. 1, and looking toward the wall 8 of the opening 7 from the cutting edge of the share. Beneath the rear free end of the lever 15 projects a hook-lug 18, the hook turned toward the pivot bolt. Loosely and detachably held within the hook 18 is the cooperating hook 20 formed at the forward end of the connecting rod 19, which extends diagonally upwardly and rearwardly, and at its rear end having a threaded portion 21. Upon the threaded portion 21 is placed a threaded hand wheel 22, adapted to screw thereon. One of the cam faces of the lug or projection 16 is adapted to engage the wall 8, as indicated in Fig. 4, in which the dotted line $8^a$ represents the wall 8 of the opening 7. For the purposes of this cam-lever 15 this opening is not a slot, as at no time does the opposite wall of the cam engage the opposite wall of the opening. The cam is made double faced only to adapt it to right hand and left hand plows. The portion of the frog $5^a$ between the two openings 7 and 9 is extended below the rear walls of said openings to afford a firm support for the share upon its upper face. It will be noticed also that the thickness of the lug 16 is greater than the thickness of the frog 5, see Fig. 3, so that the lever may turn freely without binding contact with the under face of the share.

Pivoted to the moldboard at 23, toward the outer extremity thereof, and beyond the wing 5 of the frog, is a lever 24, having a lower hook end 25 adapted to engage a stud 26 rigidly secured to the under face of the share at the outer extremity of its wing. The hook 25 is in the form of an open slot which slips over the shank $26^a$ of the stud 26; the lower wall of the hook, $25^a$ being sloped to engage the shank wedgingly as the hook is drawn to its seat against the stud 26, as shown in Fig. 6. The lower end of the stud 26 is enlarged, as shown in Fig. 5, to form a cap, the periphery thereof and the periphery of the shank $26^a$ being connected with a beveled face $26^b$, which is adapted to engage the under beveled face $25^b$ of the hook 25. The stud 26 is firmly secured to the under face of the wing of the share by the bolt $25^c$.

The opposite end of the lever 24 is expanded into a fork having the prongs $24^a$, leaving an unclosed opening or slot $24^c$. In the rear face of the fork is a circular depression $24^b$, adapted to receive the lower end of the shank $22^b$ of the wheel 22. The threaded end of the connecting rod 19 passes through this opening, and is normally held against egress therefrom laterally by the contact of the shank $22^b$ against the walls of the depression $24^b$.

It will be observed in Fig. 1, in which the share is shown in secured position, there is a straight dotted line extending between the outer extremity of the rod 19 where it contacts the rear face of the lever 24 and the center of the pivot 17 of the lever 15. It is manifest from this dotted line that the rod 19 and the lever 15 are in angular relation to the two points, and that when the wheel 22 is screwed downwardly the cam face of 16 will be rotated against the wall 8 with the effect of moving the share bodily laterally wingwardly.

Toward the rear edge of the wing 12 of the share is rigidly secured a lug 27, by the bolt 28, see Fig. 8, through the body portion thereof. Rearwardly of the bolt and body portion is a prong, $27^a$, the upper face of the prong being beveled, and the beveled face engages the forward lower corner of the frog at the rear of the recess 9 with a wedging effect. There is no boss or side projection on this lug, and it is not adapted to engage the side walls of that opening. Only the rearward portion of the lug, that is, the prong $27^a$, extends over and engages the forward corner of the frog. As explained, the portions $5^a$ of the frog extend below the contact corner of the frog and the lug only for the purpose of properly supporting the share thereon. The contact of the slope $27^a$ with the corner of the frog serves to clamp the under face of the share firmly against the upper face of the frog at the central portion of the share. Heretofore isolated circular studs have been used for the purpose of drawing the share down upon the frog, the stud entering a slot in the frog and engaging both the rear and the side walls of the slot by means of beveled surfaces. But this means of clamping the share is in practice found to be unsatisfactory, inasmuch as the friction on the side walls of the slot when the share has been firmly seated makes it difficult to release the share quickly. To avoid the difficulty I have made my improved stud or lug without means for side contact with the frog, and as the rear sloping wall $27^a$ gives the only contact with the frog, it will immediately free itself without friction as soon as the share is moved forwardly to a very slight extent.

Extending forwardly from the body portion of the lug 27 is a tail or supporting portion $27^b$, the purpose of which is to overcome the strain upon the bolt 28 as the slope $27^a$ springs the wing of the share downward upon the frog. This strain is sometimes very severe, and this projection $27^b$ is found to effectually resist the strain.

When the share 11 is in place with the lower edge of the moldboard and the rear edge of the wing of the share conjoined, and the landside of the share is against the landside of the frog, the cam lever 15, by the side pulling force of the rod 19 through the operation of the hand wheel 22 has impinged against the side wall 8 of the frog, with the result of drawing the share sideways until its landside contacts the landside of the frog, while at the same time the backward movement of the rod 19 has resulted in bodily pulling the share rearwardly and seated its edge against the lower edge of the moldboard; coactive with the movement of the lever 15, the turning of the hand wheel 22 has turned the lever 24 on its pivot, causing the hook 25 to impinge against the stud 26 with the result of drawing the wing outer edge of the share against the outer lower edge of the moldboard and drawing the wing of the share down upon the upper face of the hook in alignment with the moleboard. As the share has moved rearwardly, the sloping face 27ª of the lug 27 has engaged the corner 5ª of the frog, and with a wedging action has sprung the center of the share down upon the frog; at the same time, the stud 14 has engaged the under edge of the cut away portion 10 of the landside of the frog and forced the landside end of the wing of the share firmly down upon the landside end of the wing of the frog. Therefore, as a result of screwing the hand wheel 22 downwardly upon the thread 21 of the rod 19, the share has been automatically drawn laterally, rearwardly and downwardly to a firm seat on the frame of the plow. The lower end of the shank 22ᵇ of the hand wheel being seated in the depression 24ᵇ of the lever 24, the rod 19 cannot escape laterally from the forks 24ª, and the parts are firmly and securely locked to hold the share in working position on the frame, whence they cannot be released except by turning the hand wheel backwardly.

To quickly remove the share, all that is necessary is to slightly unscrew, by hand, the hand wheel until it is free from the walls of the depression 24ᵇ in the outer end of the lever 24, push the rod out of the slot 24ᶜ, use the rod 19 to shift the lever 15 sideways, disconnect the rod and with it give a sharp blow to the share, and all the parts are almost instantly released from their position and the share is free to be removed from the plow, without the use of any extra tools. The rod can be instantly unhooked from the lever 15. For sharpening shares it is not necessary to remove the stud, the lug and the lever 15; but if an entirely new share is to be placed on the plow, and these parts are not furnished with the new share, the parts from the old share can be very quickly placed thereon.

To place the share on the plow frame, all that is necessary is to set the share upon the frog within reach of the parts, insert the rod 19 within the slot 24ᶜ and the shank of the wheel within the depression 24ᵇ and turn the wheel downwardly, when the parts will in a very few seconds draw the share firmly to place and lock it there as before described.

The improvement herein described provides an inexpensive, and very quickly operated device for placing a share upon a plow frame in working position and securely locking it there, and for very quickly unlocking it for quickly detaching it for removal therefrom.

It is apparent that many changes from the particular embodiment of the invention might be made without departing from the invention, and it is the intention to claim all such changes as would properly come within the scope of the appended claims.

Having now described my invention, what I claim as new, and desire to protect by Letters Patent is:

1. In a plow, the combination of a landside, a moldboard, a frog having a wing portion with a vertical edge parallel with the landside, a detachable share, and means for detachably securing the share comprising a cam movably mounted on the share and adapted to contact the parallel edge of the frog and means for actuating the cam.

2. In a plow, the combination of a landside, a moldboard, a frog having a wing portion with a vertical edge parallel with the landside, a detachable plow share, a means for detachably securing the share comprising a cam movably mounted on the share and adapted to contact the parallel edge of the frog and means for actuating the cam comprising the lever.

3. In a plow, the combination of a plow frame, comprising a landside, a moldboard and a frog, a detachable plow share, and means for detachably securing the share comprising a lever pivoted on the share and having a cam at the pivot end, a hook at the opposite end, a support on the frame, and an adjustable connection between the support and the hook comprising a rod having a hook to detachably engage the hook of the lever, and a screw and a nut at the opposite end to engage the support.

4. In a plow, the combination of a plow frame, comprising a landside, a moldboard, a frog and an adjustable plow share, means for detachably securing the share comprising a lever pivoted on the share, a support on the frame, having a slot in its end and a connection between the lever and the support, and means for detachably securing the rear end of the connection to the support, comprising an open slot in the support, a recess in the rear face of the support, a thread at the rear end of the connection, and a nut thereon adapted to be seated inside of the recess.

5. In a plow the combination of a plow frame, comprising a landside, a moldboard and a frog, with a detachable plow share, and means for detachably securing the share, comprising a lever pivoted on the share and adapted to engage the frame, a lever pivoted on the frame and adapted to engage the share and a means for conjointly operating the levers.

6. In a plow, the combination of a landside, a moldboard, a frog, a lever pivoted on the share and adapted to engage the frog, a lever pivoted on the moldboard and adapted to engage the share and means for conjointly operating the two levers.

7. In a plow, the combination of a plow frame comprising a landside, a moldboard, a frog, and a detachable plow share, a lever pivoted on the share and having a cam adapted to engage the frog, means for drawing the share rearwardly, comprising a support on the frame, a connection between the lever and the support, means for shortening the connection, comprising a rod flexibly connected to the lever and means for detachably securing the rear of the connection to the support comprising an open slot.

8. In a plow, the combination of a plow frame, comprising a landside, a moldboard and a frog, and a detachable plow share, of means for seating the underface of the share upon the upper face of the frog, comprising a lug rigidly secured to the underface of the share, a projection on the lug extending rearwardly beyond the forward end of the frog, a cam on the upper face of the projection, adapted to engage the rear lower corner of the frog, the sides of the lug being free from contact with the frog, and means for drawing the share rearwardly to engage the lug with the frog.

9. In a plow, the combination of a plow frame, comprising a landside, a moldboard and a frog, and a detachable plow share, of means for seating the underface of the share upon the upper face of the frog, comprising a lug rigidly secured to the underface of the share, a projection on the lug extending rearwardly beyond the forward end of the frog, a cam on the upper face of the projection adapted to engage the rear lower corner of the frog, and a support extending forwardly from the lug and engaging the share.

WINFIELD S. NICHOLS.